United States Patent
Srinivasan et al.

(10) Patent No.: US 11,210,197 B2
(45) Date of Patent: Dec. 28, 2021

(54) PRESCRIPTIVE ANALYTICS BASED MULTI-PARAMETRIC DATABASE-COMPUTE TIER REQUISITION STACK FOR CLOUD COMPUTING

(71) Applicant: Accenture Global Solutions Limited, Dubin (IE)

(72) Inventors: Madhan Kumar Srinivasan, Bengaluru (IN); Guruprasad PV, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 35 days.

(21) Appl. No.: 16/897,906

(22) Filed: Jun. 10, 2020

(65) Prior Publication Data

US 2021/0334191 A1    Oct. 28, 2021

(30) Foreign Application Priority Data

Apr. 28, 2020  (IN) .............................. 202041018141

(51) Int. Cl.
| | | |
|---|---|---|
| *G06F 11/34* | (2006.01) | |
| *G06N 3/08* | (2006.01) | |
| *G06F 9/50* | (2006.01) | |

(52) U.S. Cl.
CPC .......... *G06F 11/3442* (2013.01); *G06F 9/505* (2013.01); *G06F 9/5044* (2013.01); *G06N 3/08* (2013.01)

(58) Field of Classification Search
CPC .... G06F 11/3442; G06F 9/5044; G06F 9/505; G06N 3/08
See application file for complete search history.

(56) References Cited

U.S. PATENT DOCUMENTS

| 9,983,795 | B1 * | 5/2018 | Naamad ................ G06F 3/0629 |
| 10,339,455 | B1 * | 7/2019 | Parush-Tzur ............ G06N 5/04 |
| 10,523,519 | B2 * | 12/2019 | Srinivasan ............ G06F 9/5027 |

(Continued)

OTHER PUBLICATIONS

Azure DTU Calculator, https://dtucalculator.azurewebsites.net/, captured by internet archive on Oct. 20, 2019, visited on Jun. 10, 2020.

(Continued)

*Primary Examiner* — Benjamin C Wu
(74) *Attorney, Agent, or Firm* — Crowell & Moring LLP

(57) ABSTRACT

A multi-layer tier requisition stack may generate prescriptive tier requisition tokens for controlling requisition of database-compute resources at database-compute tiers. The input layer of the tier requisition stack may obtain historical data and database-compute tolerance data. The coefficient layer may be used to determine activity coefficients for each data type within the historical data. The activity coefficients may then be combined to determine an overall activity factor. The tolerance layer may be used to select an initial database-compute tier based on the activity factor. The tolerance layer may then increase from the initial database compute tier to an adjusted database-compute tier while accommodating tolerances within the database-compute tolerance data. The requisition layer may generate a tier requisition token based on the adjusted database-compute tier and/or finalization directives obtained at the requisition layer.

20 Claims, 6 Drawing Sheets

(56) References Cited

U.S. PATENT DOCUMENTS

| | | | |
|---|---|---|---|
| 2014/0245305 A1* | 8/2014 | Miles | G06F 9/5083 |
| | | | 718/100 |
| 2014/0325151 A1* | 10/2014 | Kim | G06F 16/185 |
| | | | 711/117 |
| 2015/0339572 A1* | 11/2015 | Achin | G06Q 10/06 |
| | | | 706/46 |
| 2017/0139833 A1* | 5/2017 | Barajas Gonzalez | G06F 12/08 |
| 2017/0315924 A1* | 11/2017 | Blount | G06F 12/10 |
| 2018/0046926 A1* | 2/2018 | Achin | G06Q 10/04 |
| 2018/0060744 A1* | 3/2018 | Achin | G06N 5/02 |
| 2018/0246926 A1* | 8/2018 | Altaf | G06F 16/215 |
| 2019/0179675 A1* | 6/2019 | Srinivasan | G06F 9/451 |
| 2019/0317808 A1* | 10/2019 | Srinivasan | H04L 67/10 |
| 2020/0134423 A1* | 4/2020 | Shinde | G06F 11/0787 |
| 2020/0210443 A1* | 7/2020 | Srinivasan | G06F 16/254 |
| 2020/0218974 A1* | 7/2020 | Cheng | A61B 5/1038 |

OTHER PUBLICATIONS

"Choose between the vCore and DTU purchasing models" article dated Mar. 9, 2020, https://docs.microsoft.com/en-us/azure/sql-database/sql-database-purchase-models, captured by internet Archive on Mar. 21, 2020, visited Jun. 10, 2020.

\* cited by examiner

US 11,210,197 B2

PRESCRIPTIVE ANALYTICS BASED MULTI-PARAMETRIC DATABASE-COMPUTE TIER REQUISITION STACK FOR CLOUD COMPUTING

PRIORITY

This application claims priority to Indian Provisional Patent Application No. 202041018141, filed Apr. 28, 2020, and titled Prescriptive Analytics Based Multi-Parametric Database-Compute Tier Requisition Stack for Cloud Computing, which is incorporated by reference in its entirety.

TECHNICAL FIELD

This disclosure relates to database-compute tier requisition via a prescriptive analytics based tier requisition stack.

BACKGROUND

Rapid advances in communications and storage technologies, driven by immense customer demand, have resulted in widespread adoption of cloud systems for managing large data payloads, distributed computing, and record systems. As one example, modern enterprise systems presently maintain data records many petabytes in size in the cloud. Improvements in tools for cloud resource allocation and consumption prediction will further enhance the capabilities of cloud computing systems.

DETAILED DESCRIPTION

Figure 1:
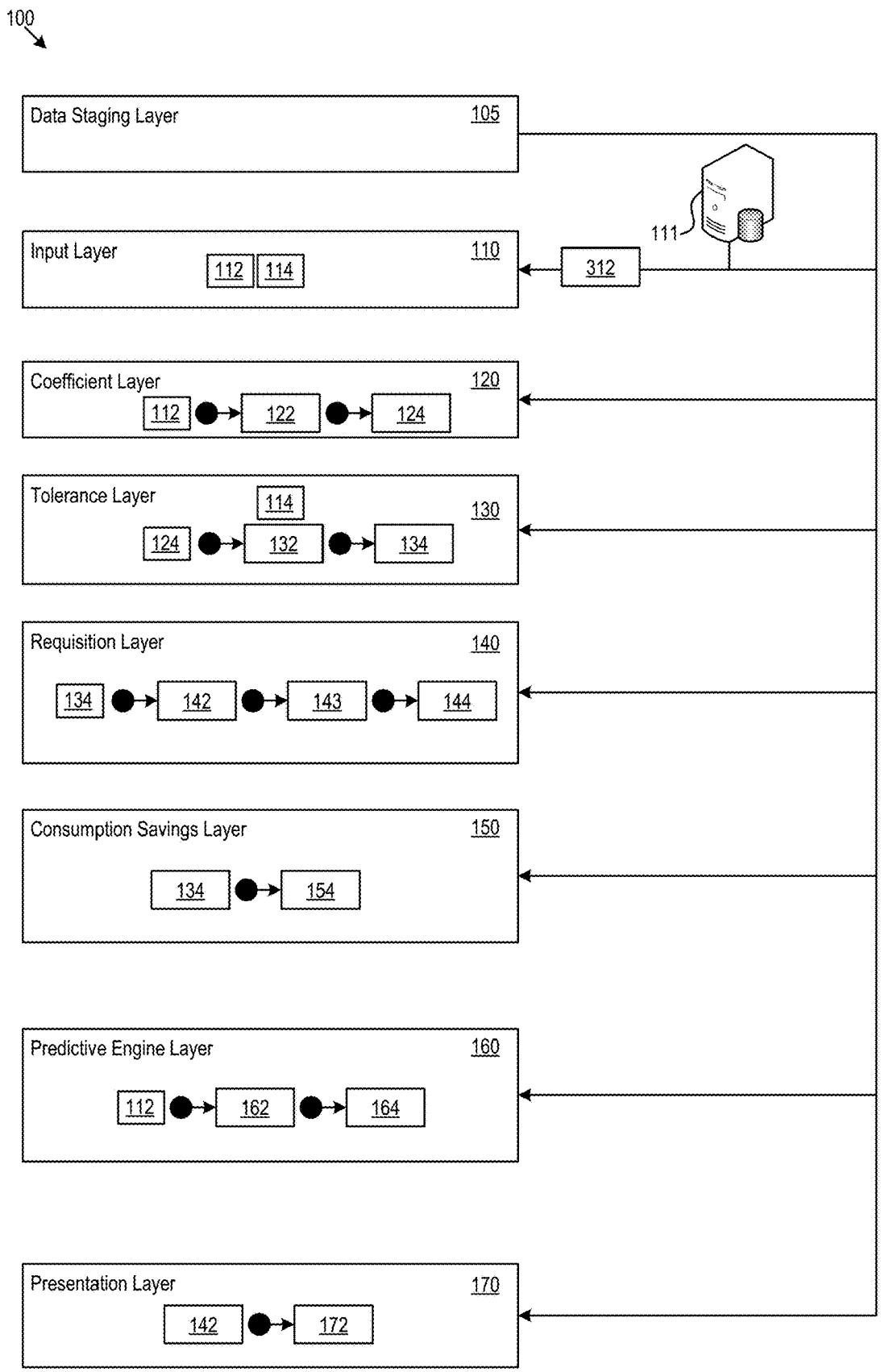
FIG. 1 shows an example multiple-layer tier requisition stack.

In cloud computing systems, database-compute resources (e.g., database processor resources, data transaction resources, database connection resources, data transfer throughput resources, or other database-compute resources) may be requisitioned e.g., from database-compute providers such as Azure or other database systems. Various different implementations may provide tiered database-compute offerings where the various tiers provide database-compute resources covering various activity levels as indicated by activity factors. Activity factors may be determined using a combination (e.g., weighted sum, weighted average, sum average, or other weighted/non-weighted combination) of database-compute data type activity coefficients (e.g., indications of database-compute activity in various types, such as processor utilization data types, database-compute operation-rate data types, flush volume data types (e.g., log flush), and/or other database-compute activity data types). In some cases, a requisition at a particular data tier may represent on underprovision or overprovision of an allowed activity for a particular database-compute system. Although, for example, a given tier may accommodate activity levels for one type of activity. For example, a requisitioned database-compute tier may appropriately support one or more activity level types for a given system. However, other activity types may not necessarily be adequately supported. For example, a given database-compute tier may offer activity levels that reflect processor utilization activity levels, but inadequately address activity levels as indicated by log flush data and/or operation-rate (e.g., database connection/session/transaction operate-rates). In another example, a flush data alone might indicate an activity level that is unduly high given comparatively low processor activity for the example system. Thus, consideration of multiple indications of activity level may reduce the risk of underprovision or overprovision. Further, resources dedicated to the overprovisioning of the requisitioned database-compute tier (that does not improve computing performance) could instead be applied to other computing resources that may improve computing performance of the system (as a whole) including, in some cases, non-database compute computing resources. Conversely, an underprovisioned database-compute tier may be operated continually at (or over) capacity and may be unable to fulfill database-compute operations without latency, connection/session backlog accumulation, or other degraded performance. Accordingly, an overprovisioned or underprovisioned database-compute tier may lead to performance degradation or inefficient deployment of hardware resources.

Accordingly, increased database-compute tier requisition accuracy provides a technical solution to the technical problem of system inefficiency by increasing the utilization and efficiency of cloud-based database-compute system. The tier requisition stack techniques and architectures described below may be used to prescribe database-compute tier requisitioning. A tier requisition stack may provide prescriptive analytical database-compute tier correction taking into account allowed database-compute operation-rates, processor utilization patterns, flush data, concurrent session data, concurrent request data, online transaction processing (OLTP) storage requirements, and/or other data. Thus, the disclosed tier requisition stack techniques computing efficiency/accuracy and provide an improvement over existing solutions. Further, the tier requisition stack techniques and architectures provide a practical solution to the technical problem of efficient storage volume provision.

The tier requisition stack architectures and techniques may analyze historical data which may include allowed database-compute operation-rates, processor utilization patterns, flush data, and/or other data; and tolerance data that may include concurrent session data, concurrent request data, online transaction processing (OLTP) storage requirements, and/or other data. In some implementations, the tier requisition stack architectures and techniques may analyze expenditure report data (e.g., consumption metric data) for database-compute resource use: processor activity, memory usage history, storage volume input/output operation history. Furthermore, layers (such as predictive engine layers) may use computing cycles, data throughput, or other utilization metrics, seasonal usage cycles e.g., holiday schedules, daily usage cycles, weekly usage cycles, quarterly usage cycles or other data to forecast future usage. Additionally or alternatively, consumption metric data may include computing resource specific cost metrics such as expenditure-per-time or resource-per-time metrics.

FIG. 1 shows an example multiple-layer tier requisition stack 100, which may execute on tier requisition circuitry making up the hardware underpinning of the tier requisition stack 100. In this example, the tier requisition stack 100 includes a data-staging layer 105, an input layer 110, a coefficient layer 120, a tolerance layer 130, a requisition layer 140, a consumption savings layer 150, a predictive engine layer 160, and a presentation layer 170. The tier requisition stack 100 may include a multiple-layer computing structure of hardware and/or software that may provide prescriptive analytical recommendations (e.g., prescriptive allowed operation-rates) through data analysis.

In some implementations, as discussed below, the deep-learning-based multi-parametric database transaction unit optimization engine developed by Accenture® Bangalore may be operated as the tier requisition stack 100.

A stack may refer to a multi-layered computer architecture that defines the interaction of software and hardware resources at the multiple layers. The Open Systems Interconnection (OSI) model is an example of a stack-type architecture. The layers of a stack may pass data and hardware resources among themselves to facilitate data processing. As one example for the tier requisition stack 100, the data-staging layer 105 may provide the coefficient layer 120 with data access resources to access historical data data-types stored in memory. Hence, the data-staging layer 105 may provide a hardware resource, e.g., memory access resources, to the coefficient layer 120. Accordingly, the multiple-layer stack architecture of the tier requisition stack may improve the functioning of the underlying hardware.

Figure 2:
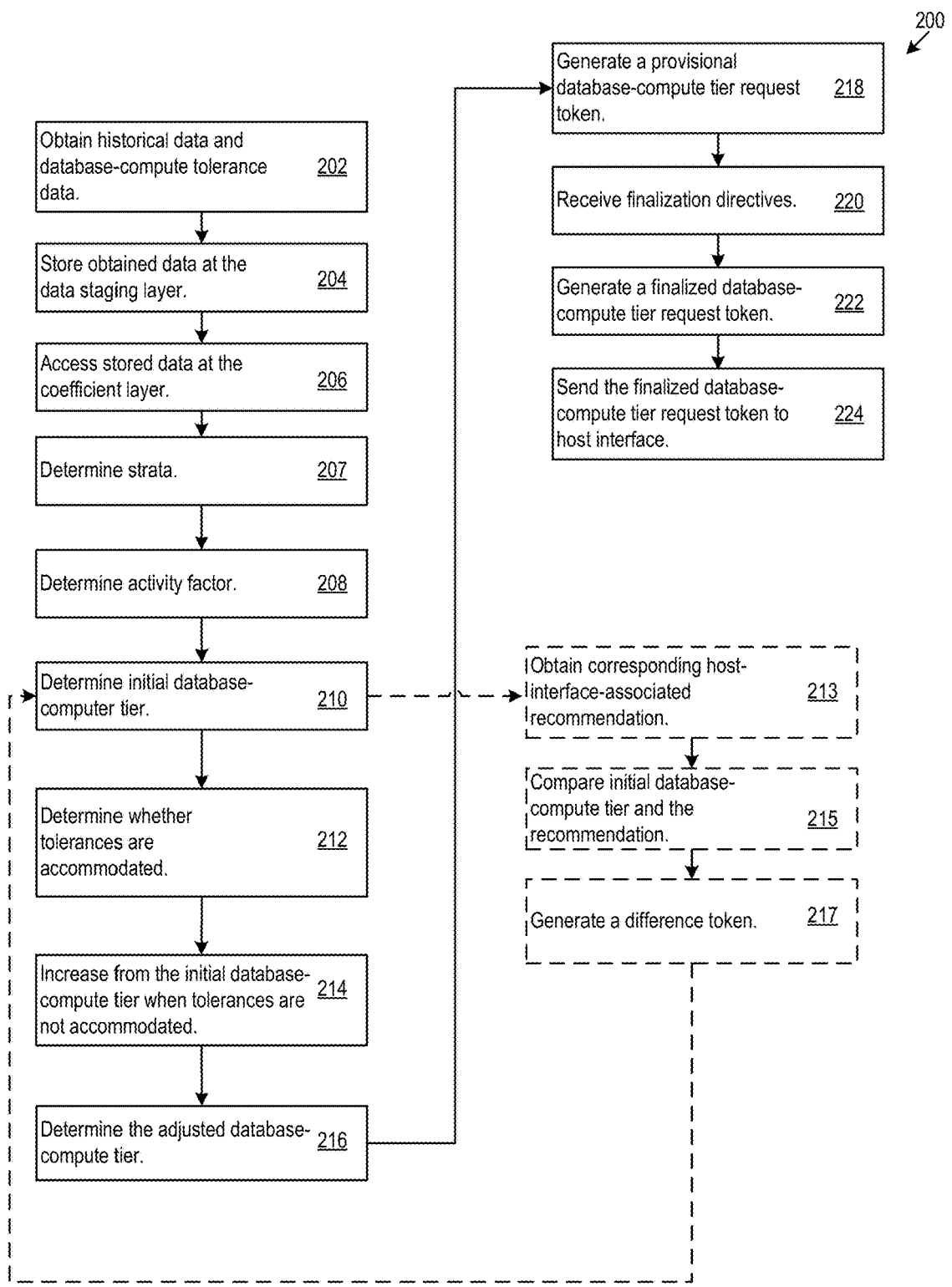
FIG. 2 shows example tier requisition stack logic.

In the following, reference is made to FIG. 1 and the corresponding example tier requisition stack logic (TRSL) 200 in FIG. 2. The logical features of TRSL 200 may be implemented in various orders and combinations. For example, in a first implementation, one or more features may be omitted or reordered with respect to a second implementation. At the input layer 110 of the tier requisition 100, the TRSL 200 may obtain historical data 112 and database-compute tolerance data 114 (202) and then store the historical data 112 and database-compute tolerance data 114 at the data-staging layer 105 (204). In some cases, historical data 112 and database-compute tolerance data 114 may be received via communication interfaces (e.g., communication interfaces 312, discussed below). The historical data 112 and/or database-compute tolerance data 114 may be accessed at least in part, e.g., via the communication interfaces 312, from data sources 111, which may include, sources. The historical data 112 and/or database-compute tolerance data 114 may be provided by database-compute history databases, cloud expenditure databases, committed-use history databases, or other utilization data sources. The database-compute tolerance data 114 may be provided by client preferences, service logs, description data, queries, or other database-compute data sources. Consumption metric data, as discussed below, may be obtained from cloud expenditure databases, master database-compute cost databases, expenditure histories, or other consumption metric data sources.

After the historical data, including various data types, such as processor utilization type data detailing processor usage over time, operation rate date detail rates and time-transaction-densities of database-compute operations/transactions, flush data detailing flushes of logs or other flushes, and/or other data, is obtained and stored the TRSL 200 at coefficient layer of the tier requisition stack may access the historical data (206). For each of the data types within the historical data, the TRSL 200 may determine a stratum from among strata defined for each type (207). In other words, each type of historical data may have multiple strata defined for various levels indicated by the data. The TRSL 200 may select among the defined strata (which may be distinct for each type) to determine a stratum matched by the data.

Each stratum of the strata has an associated activity coefficient 122. The activity coefficients 122 indicate a level of activity that is reflected by the data type. For example, data for processor usage may indicate a particular activity level, while flush data may indicate another activity level. Due to the complex nature of the database compute activity, multiple activity measures (e.g. historical data types) may be used to determine a picture of database-compute activity. Accordingly, the coefficient layer may determine a stratum (and corresponding activity coefficient) for each data type to determine a multiple part picture of database-compute activity rather than rely on a single measure of database-compute activity.

Table 1 shows example strata defining various coefficients (coeff) for data types. However, in some cases, other strata may be defined.

TABLE 1

Example Strata

| | 1 Core | | 2-4 Cores | | 5-8 Cores | | 9-13 Cores | |
|---|---|---|---|---|---|---|---|---|
| | Strata | coeff | Strata | coeff | Strata | coeff | Strata | coeff |
| CPU | 0-6% | 3 | 0-6% | 13 | 0-6% | 25 | 0-6% | 44 |
| | 7%-24% | 13 | 7%-24% | 63 | 7%-24% | 125 | 7%-24% | 219 |
| | 25%-48% | 25 | 25%-48% | 125 | 25%-48% | 250 | 25%-48% | 438 |
| | 49%-78% | 44 | 49%-78% | 219 | 49%-78% | 438 | 49%-78% | 766 |
| | 79%-100% | 100 | 79%-100% | 500 | 79%-100% | 1000 | 79%-100% | 1750 |
| Read/Write | 2000 IOPS | 6 | 2000 IOPS | 31 | 2000 IOPS | 63 | 2000 IOPS | 109 |
| IOPS | 2000-6000 | 13 | 2000-6000 | 63 | 2000-6000 | 125 | 2000-6000 | 219 |
| | 6000-12000 | 25 | 6000-12000 | 125 | 6000-12000 | 250 | 6000-12000 | 438 |
| | 12000-22000 | 44 | 12000-22000 | 219 | 12000-22000 | 438 | 12000-22000 | 766 |
| | 22000-30000 | 100 | 22000-30000 | 500 | 22000-30000 | 1000 | 22000-30000 | 1750 |
| Log Flush | 0-5 MB | 6 | 0-5 MB | 31 | 0-5 MB | 63 | 0-5 MB | 109 |
| (MB) | 5-10 MB | 13 | 5-10 MB | 63 | 5-10 MB | 125 | 5-10 MB | 219 |
| | 10-25 MB | 25 | 10-25 MB | 125 | 10-25 MB | 250 | 10-25 MB | 438 |
| | 25-40 MB | 44 | 25-40 MB | 219 | 25-40 MB | 438 | 25-40 MB | 766 |
| | 40-75 MB | 100 | 40-75 MB | 500 | 40-75 MB | 1000 | 40-75 MB | 1750 | database-compute utilization history databases, cloud expenditure databases, master virtual machine cost databases, use-history databases, storage access logs, virtual machine family/template description data, or other data In some implementations, strata may be provided for use of a single processor core (which may be virtualized) rather than providing separate strata from a number of different core numbers. In some cases, the activity coefficients for the strata may be multiplied by the core factor to obtain coefficients for numbers of cores greater than one.

For each of the activity coefficients 122, the TRSL 200 (at the coefficient layer) may determine corresponding type weight. As a corollary to determining multiple coefficients, the TRSL 200 may determine a technique for combination of the coefficients to construct the activity picture. Weighting the coefficients may allow the most probative coefficients to provide the largest contribution to the determination of overall activity level while allowing the least probative coefficients to provide the smallest contributions. In an example weighting, the coefficients may be combined such that processor utilization is given a 65% weight, the read portion of the operation rate is given a 12.5% weight, the write portion of the operation rate is given a 12.5% weight, and the flush data is given a 10% weight (e.g., in a weighted sum). In some cases, other weights may be used.

The TRSL 200 may use the weighted combination to determine an activity factor 124 (208). In some cases, a unified measure of activity may be used among the data types, such as a data transaction unit, such as those used in Azure database systems. Thus, the individual coefficients and weighted combination may be expressed in a common unit type. The activity factor may provide an overall picture of database-compute activity by reflecting a combination of activity levels determined based on each of the various data types.

The TRSL 200 may store the activity factor 124 using resources provided via the data-staging layer 105. The TRSL 200 may then access the activity factor 124 at the tolerance layer 130. At the tolerance layer 130, the TRSL 200 may determine an initial database-compute tier 132 based on the activity factor 124 (210). The initial database-compute tier may be selected to accommodate the activity level indicated by the activity factor.

In various implementations, a given database tier may accommodate, e.g., via database-compute allowances, other database-compute actions that may not necessarily be reflected in the activity factor and/or historical data. Accordingly, the TRSL 200 may compare the one or more database-compute allowances of the initial database-compute tier to determine whether the initial database-compute tier accommodates the database-compute tolerances indicated in the database-compute tolerance data (212). For example, the database-compute tolerance data may indicate whether OTLP support may be compulsory, how many concurrent sessions/requests may be tolerated, how many queued request may be tolerated, what level of storage may be compulsory, and/or other tolerance data.

If the TRSL 200 determines that some or all of the database-compute tolerances are not met, the TRSL 200 may increase the database-compute tier that will be requested (e.g., increase the database-compute tier from (e.g., relative to) the initial database-compute tier (214). In some cases, the TRSL 200 may increase (relative the initial database-compute tier) by one increment to determine an iterated database-compute tier (e.g., to execute the increasing in an iterative fashion).

After increasing, the TRSL 200 may rerun the comparison to determine whether the increased database-compute accommodates the database-compute tolerances indicated in the database-compute tolerance data. When a database-compute tier is found that accommodates the database-compute tolerances, the TRSL 200 may determine that database-compute tier to be the adjusted database-compute tier (216). The TRSL 200 may store an indication of the adjusted database-compute tier via memory resources provide by the data-staging layer 105.

At the requisition layer 140, the TRSL 200 may generate a provisional tier requisition token 142 designating a request for database-compute resources as the adjusted database-compute tier 134 (218). Responsive to the provisional tier requisition token, the TRSL 200 may receive (and/or determine) one or more finalization directives 143 (220). The finalization directive 143 may, for example, include commands received from an operator via a tier requisition (TR)-command interface 172 generated at the presentation layer 170. The commands may change and/or confirm the selection of the adjusted database-compute tier. The finalization directive may, for example, include feedback-based machine-learning-trained (e.g., using various machine-learning schemes, deep-learning, neural networks, and/or other machine-learning schemes) adjustments to the adjusted database-compute tier. The feedback (on which to base the machine-learning training) may include operator commands, for example, those received at the TR-command interface 172.

Based on the finalization directive 143, TRSL 200 may generate a finalized tier request token 144 (222). The finalized tier request token 144 may, in some cases, designate a request for resources at the adjusted database-compute tier (e.g., when the finalization directive confirms the request for resources at the adjusted database-compute tier). In some cases where the finalization directive indicates a change relative to the adjusted database-compute tier, the finalized tier request token 144 may designate a request for resources at a finalized database-compute tier that reflects the changes requested relative to the adjusted database-compute tier.

After generating the finalized tier request token 144, the TRSL 200 may send the finalized tier request token (224) to a host interface that controls reservation and/or requisition of data-compute resources to execute the request for resources reflected in the finalized tier request token 144.

In some implementations, the TRSL 200 may determine a level of agreement between a tier recommendation provided via a tier recommendation system associated with the host interface. Accordingly, the TRSL 200 may determine whether prescriptions provided by the TRSL 200 for the database-computer tier perform similarly to those that would be provided with the system associated with the host interface. Comparison with host-interface-associated recommendations may allow for adjustment for harmonious operation with the host interface and/or continuity in performance (e.g., meeting performance expectations of operator using the host interface). In some implementations, the TRSL 200 may provide the historical data to the host-interface-associated recommendation system to obtain a corresponding recommendation form the host-interface-associated recommendation system (213). The host-interface-associated recommendation system may provide a recommendation in response. The TRSL 200 may compare the initial database-compute tier to the host-interface-associated recommendation (215) and generate a difference token when they differ (217). In some cases, the TRSL 200 may take no action in response to the difference token and use it as a marker of an identified instance of a difference. In some case, the TRSL 200 may supplant with the initial database-compute tier with the tier from the host-interface-associated recommendation. In an illustrative example, the deep-learning-based multi-parametric database transaction unit optimization engine may compare an initial database-compute tier recommendation with an Azure® tier recommendation.

In some implementations, the predictive engine layer 160 may generate forecasted utilization data 162 based on the historical data and/or database-compute tolerance data. For example, the predictive engine layer 160 may train a deep-learning (or other machine-learning algorithm) using the historical data and/or database-compute tolerance data. The trained algorithm may then be used to predict future utilization data for each of the data types. The forecasted utilization data may be used to determine forecasted strata for the data types. The forecasted strata may be used to determine forecasted activity coefficients for the data types. The forecasted activity coefficients may be used to determine forecasted activity factor, and the forecasted activity factor may be used to determine a forecasted database-compute tier. The forecasted database-compute tier 164 may be used to determine a future tier recommendation to provide the operator with an expectation as to how usage may change over time.

In some cases, the forecasted utilization data accuracy may fall below a desired level. After training a model (such as a deep learning model or machine learning model), the TRSL 200 may determine accuracy be generating forecasted utilization data for a past period for which historical utilization data is available or later comparing forecasted future values to eventual measured values. In some cases, recent historical data may be compared to upcoming forecasted data (such as in the pseudocode below). The TRSL 200 may compare the forecasted data to the measured/historical data and determine the accuracy of the model. Other measure of accuracy may be used, for example model confidence measures or other accuracy measures. When the accuracy of the model falls below a desire level (for example, an accuracy threshold) the TRSL 200 may forgo reliance on forecasted utilization data from the predictive engine layer. Table 2 shows example pseudocode for implementation determination of reliance on forecasted utilization data.

TABLE 2

Example pseudocode for implementation determination of reliance on forecasted utilization data

| | |
|---|---|
| Code | $\Omega' = IF(\epsilon > = 0.9, IF (\alpha' < = \pi', [(\gamma'(n) + \gamma'(n)*\varrho')], [(\gamma'(n) + \gamma'(n)*\beta')]), IF ((\alpha' < = \pi')$ THEN MAX $([(\gamma'(n) + \gamma'(n)*\varrho')], [(\epsilon(t) + \epsilon(t)*\varrho')])$ ELSE MAX $([(\gamma'(n) + \gamma'(n)*\beta')], [(\epsilon(t) + \epsilon(t)*\beta')]))$ |
| Variables | $\epsilon$ = Forecast Model Accuracy<br>$\alpha'$ = Throughput Consumption Ratio = $\omega(t)/\epsilon(t)$<br>$\omega(t)$ = Accommodated Activity Factor for Current Tier<br>$\epsilon(t)$ = 99th percentile Activity Factor for the past "t" days (obtained from historical data (in some cases also tolerance information))<br>$\beta'$ = Upper Buffer (~10%) & $\varrho'$ = Lower Buffer (~5%)<br>$\pi'$ = Activity Factor threshold such that $1 < \pi < 1.1$<br>$\gamma'(n)$ = Forecasted/Predicted Activity Factor for the next "n" days |

In some implementations, TRSL 200, at the consumption savings layer 150, may obtain consumption metric data to determine a consumption rate/level for the initial and/or adjusted database-compute tiers. The TRSL 200 may further obtain consumption metric data for a historical database-compute tier used by the operator at the time the historical data was collected. The TRSL 200 may compare consumption at the historical and the adjusted database-compute tiers to determine a consumption change factor and/or the initial and the adjusted database-compute tiers to determine an accommodation consumption factor. The consumption change factor may provide an indication of the change in consumption (e.g., a savings, a cost, or other change in consumption) from the historical database-compute tier previously used by the operator. The accommodation consumption factor provides an indication of the change in consumption from accommodation of database-compute tolerances. In some cases, the TRSL 200 may revert and/or reduce the shift in number of tier associated with a change if the consumption change factor and/or accommodation consumption factor exceed a threshold. For example, the threshold may include a 5%, 10%, 15% or other portion change in increased costs (or, in some cases, any change, including consumption savings, determined to be too dramatic, as defined by the thresholds). The resultant tier is the consumption-adjusted database-compute tier 154, which may supplant the adjusted database-compute tier 134 for actions at the requisition layer.

Figure 3:
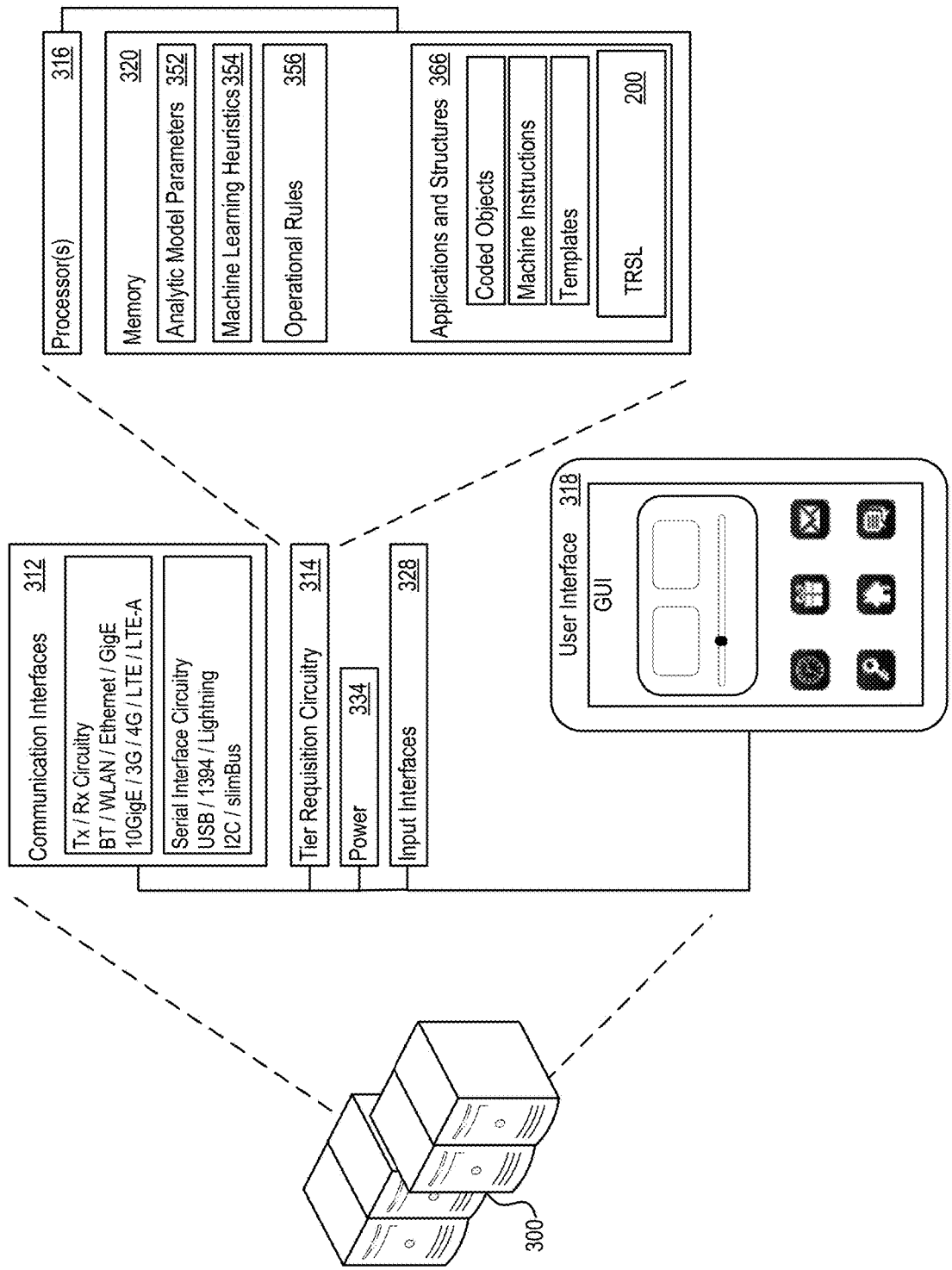
FIG. 3 shows an example specific execution environment for the tier requisition stack of FIG. 1.

FIG. 3 shows an example specific execution environment 300 for the tier requisition 100 described above. The execution environment 300 may include tier requisition circuitry 314 to support execution of the multiple layers of tier requisition stack 100 described above. The tier requisition circuitry 314 may include processors 316, memory 320, and/or other circuitry.

The memory 320 may include analytic model parameters 352, machine learning heuristics 354, and operational rules 356. The memory 320 may further include applications and structures 366, for example, coded objects, machine instructions, templates, or other structures to support historical data analysis, tolerance accommodation, strata selection or other tasks described above. The applications and structures may implement the TRSL 200.

The execution environment 300 may also include communication interfaces 312, which may support wireless, e.g. Bluetooth, Wi-Fi, WLAN, cellular (4G, LTE/A), and/or wired, Ethernet, Gigabit Ethernet, optical networking protocols. The communication interfaces 312 may also include serial interfaces, such as universal serial bus (USB), serial ATA, IEEE 1394, lighting port, $I^2C$, slimBus, or other serial interfaces. The communication interfaces 312 may be used to support and/or implement remote operation of the TR-command interface 172. The execution environment 300 may include power functions 334 and various input interfaces 328. The execution environment may also include a user interface 318 that may include human-to-machine interface devices and/or graphical user interfaces (GUI). The user interface 318 may be used to support and/or implement local operation of the TR-command interface 172. In various implementations, the tier requisition circuitry 314 may be distributed over one or more physical servers, be implemented as one or more virtual machines, be implemented in container environments such as Cloud Foundry or Docker, and/or be implemented in Serverless (functions as-a-Service) environments.

In some cases, the execution environment 300 may be a specially-defined computational system deployed in a cloud platform. In some cases, the parameters defining the execution environment may be specified in a manifest for cloud deployment. The manifest may be used by an operator to requisition cloud based hardware resources, and then deploy the software components, for example, the tier requisition stack 100, of the execution environment onto the hardware resources. In some cases, a manifest may be stored as a preference file such as a YAML (yet another mark-up language), JSON, or other preference file type.

Figure 4:
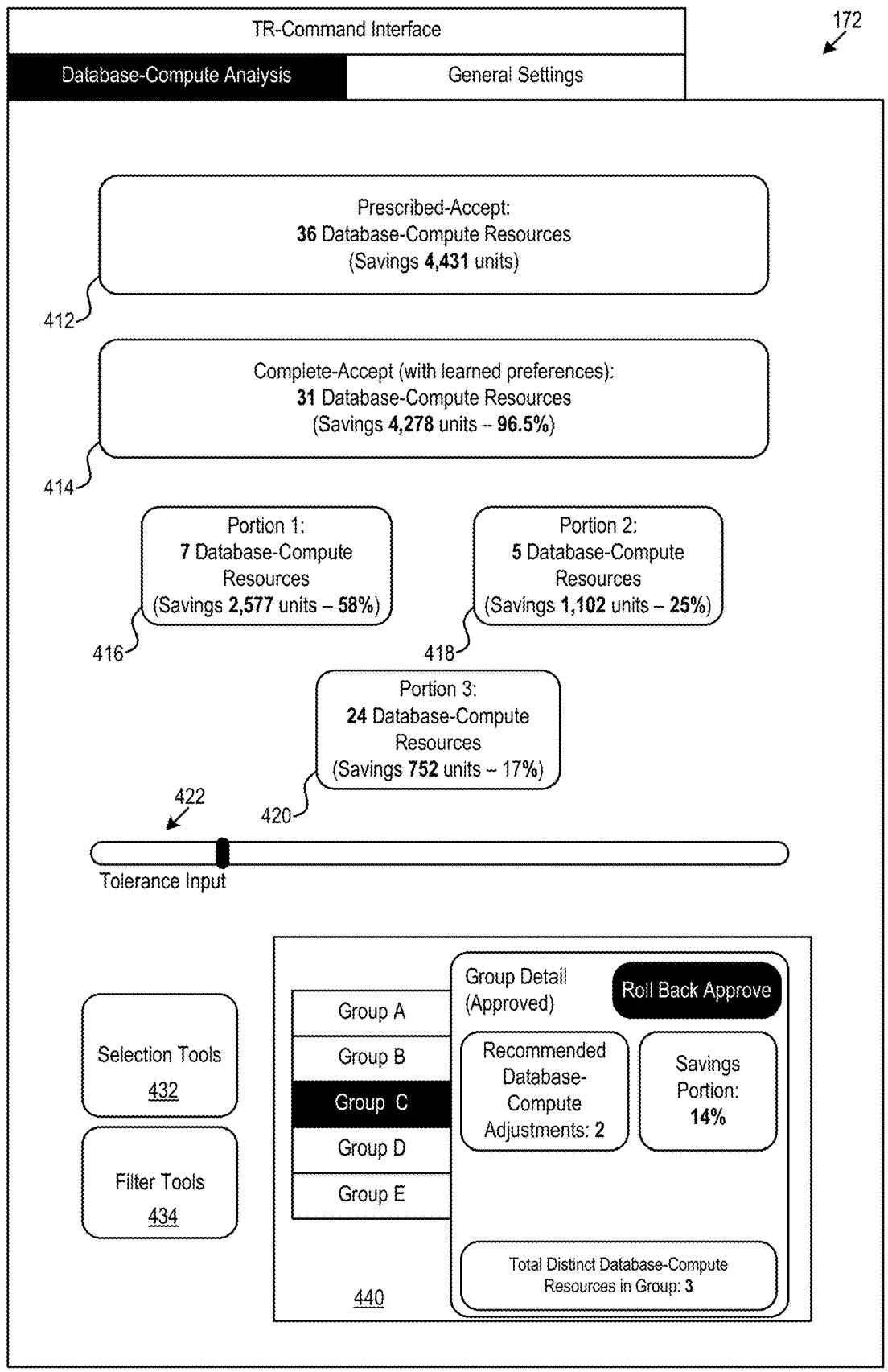
FIG. 4 shows an example tier requisition (TR)-command interface.

Referring now to FIG. 4, an example TR-command interface 172 is shown. The TR-command interface 172 may include multiple selectable options 412, 414, 416, 418, 420, 422 and data regarding the adjusted database-compute tier and/or class placement prescriptions adjustments before and after alteration to accommodate the learned preferences of the operator. In this example scenario, the selectable options may include a prescribed-accept option 412 to implement some or all of the prescribed adjusted database-compute tiers (e.g., for multiple parallel analyses) as a group without alteration based on learned preferences, a complete-accept option 414 to implement the adjusted database-compute tiers with alterations (finalization directives) based on learned preferences, options 416, 418, 420 to implement augments to selected subsets of the computing resources, option 422 to adjust preferences (e.g., selection inputs, threshold ratios, adjustment buffers or other tier requisition analysis inputs) and re-run the routine at the coefficient and tolerance layer, or other selectable options to control finalized tier requisition token output.

Additionally or alternatively, the TR-command interface 172 may include selection and filter tools 432, 434 to support granular manipulation of the tier requisition adjustments, e.g., by resource region, by tolerances accommodated; or other granular manipulation.

In some implementations, the TR-command interface 172 may include a group detail panel 440 for management of group-level selectable options such as group level approvals of database-compute tiers. Additionally or alternatively, the group detail panel 440 may display group-level information regarding database-compute tier selection. The group detail panel 440 may also provide an option to roll back previously approved database-compute tiers.

In the example, shown in FIG. 4, the options 416, 418, 420 allow for manipulation of selected subsets of the database-compute resources. For example, as shown the example routine in table two, the tier requisition adjustments may be "binned" into consumption savings classes. For example, "high", "medium", and "low" consumption savings bins may allow the operator to select specific groups of tier requisition adjustments (e.g., as determined as the consumption savings layer 150). The options 416, 418, 420 show the respective portions of the total consumption savings that may be achieved by adjusting each specific subset of the database-compute tiers. In the example, the first subset option 416 provides the greatest marginal consumption savings, while the options 418, 420 provide successively smaller marginal consumption savings.

Figure 5:
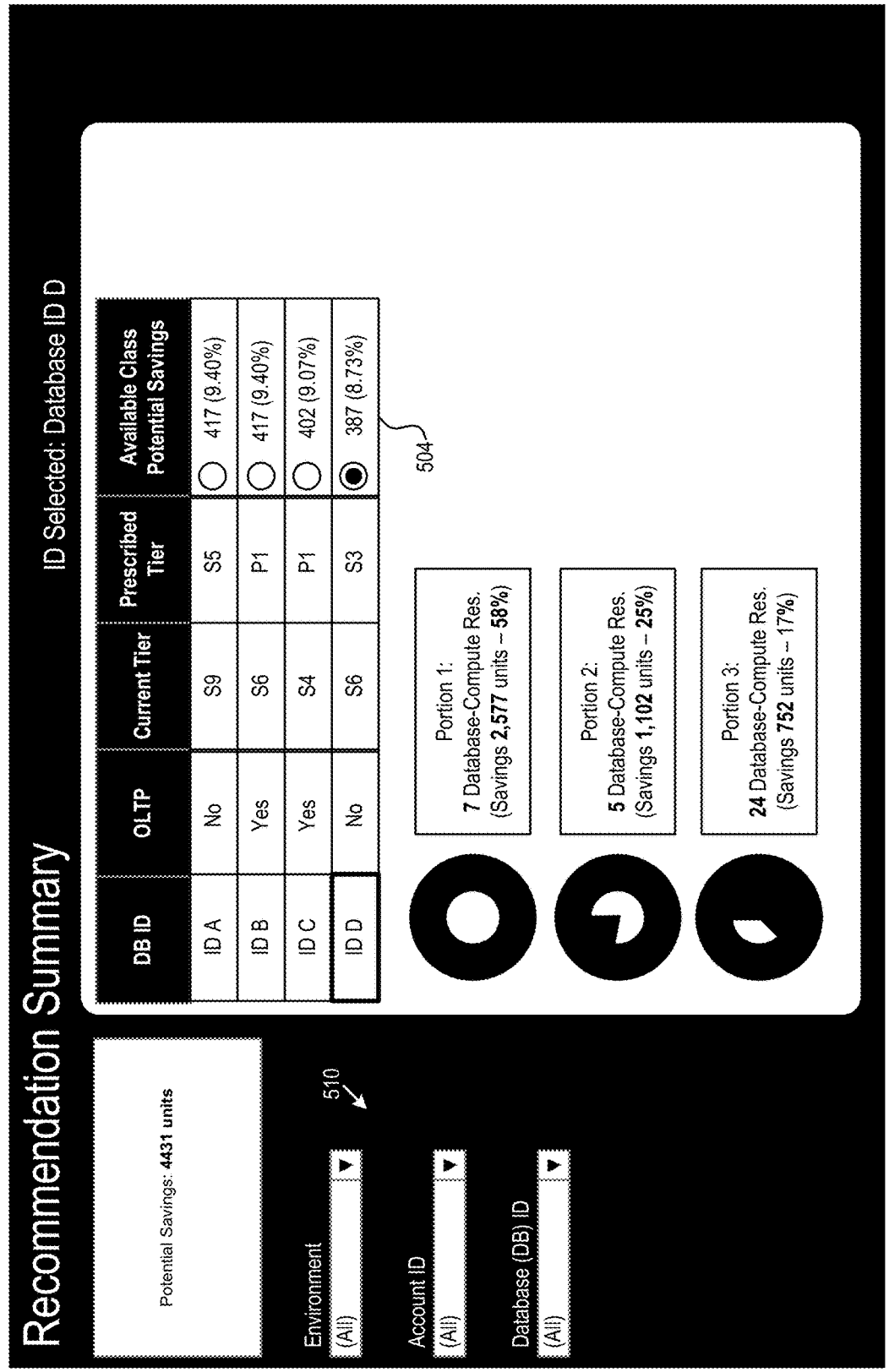
FIG. 5 shows a second example TR-command interface.

FIG. 5 shows a second example TR-command interface 500. The second example TR-command interface 500 is database identifier (e.g., a specific and/or unique designation for a given database-compute resource) specific. The TR-command interface 500 provides detail panels 504 with regard to consumption savings for the selected database-compute resource (DB ID). Selections based on operator preferences may be made within the detail panels 504. The TR-command interface 500 may further include tools 510 for filtering and selecting database identifiers for detail display within the example TR-command interface 500.

Figure 6:
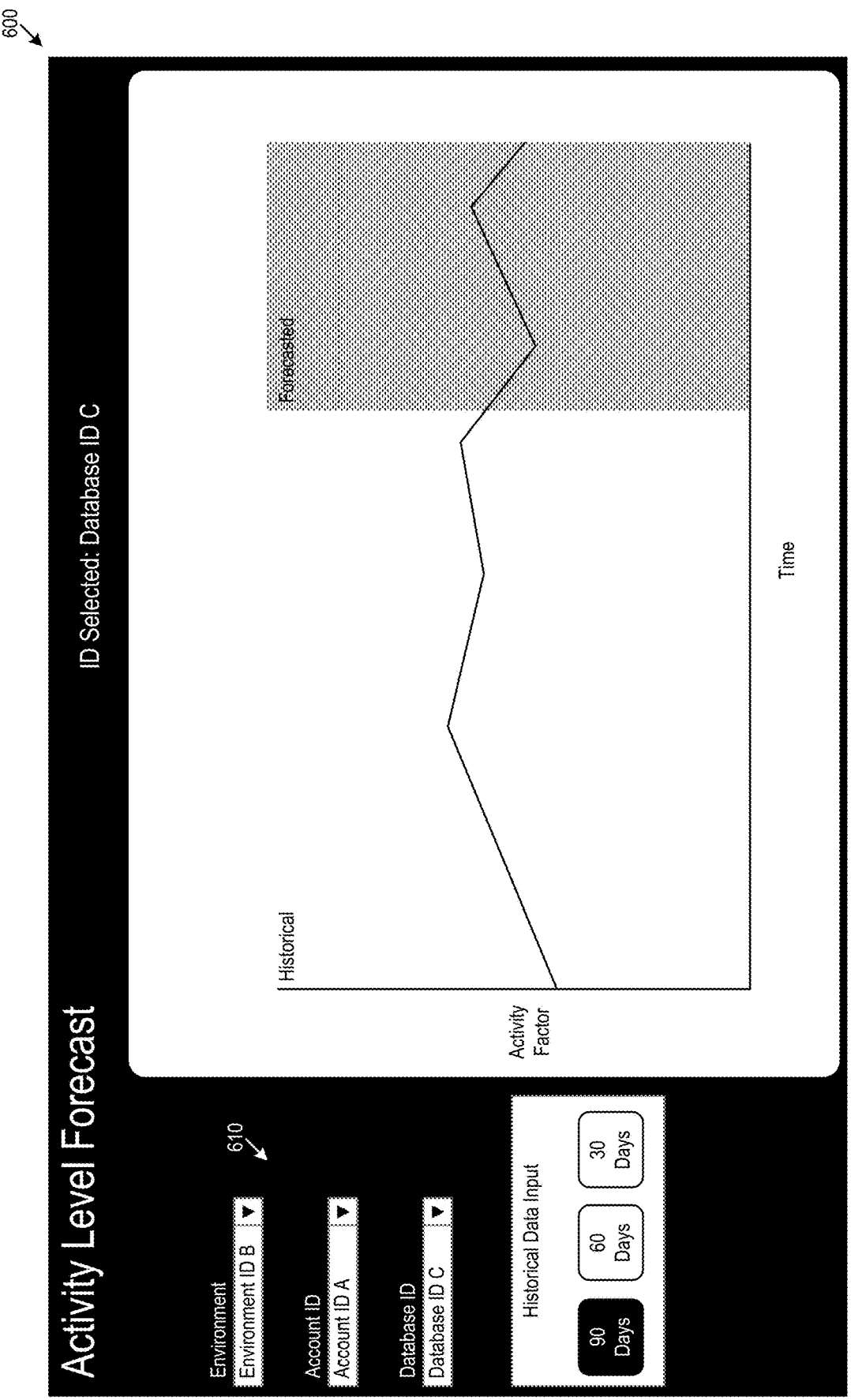
FIG. 6 shows a third example TR-command interface.

FIG. 6 shows a third example TR-command interface 600. The third example TR-command interface 600 is identifier (e.g., a specific and/or unique designation for a given database resource) specific. The example TR-command interface may show a plot of activity factor over time a database-compute resource for both historical and forecasted periods. The TR-command interface 600 may further include tools 610 for filtering and selecting database identifiers for detail display.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations may use the techniques and architectures described above.

A1 In an example, a system includes: tier requisition circuitry configured to execute a tier requisition stack, the tier requisition circuitry configured to: at a data input layer of the tier requisition stack: obtain historical data including data types, the data types including processor utilization type data, operation rate type data, flush volume type data, or any combination thereof; and obtain database-compute tolerance data establishing one or more database-compute tolerances; at a coefficient layer of the tier requisition stack: access the data types via a memory resource provided by a data-staging layer of the tier requisition stack; determine a corresponding stratum from among strata for each of the data types, where each stratum of the strata is assigned a corresponding activity coefficient; for each of the data types, obtain a corresponding type weight; and combine the corresponding activity coefficients in accord with the corresponding type weights to obtain an activity factor; at a tolerance layer of the tier requisition stack: determine an initial database-compute tier based on the activity factor, the initial database-compute tier associated with a database-compute allowance; compare the database-compute allowance to the database-compute tolerance data to determine accommodation of the one or more database-compute tolerances by the initial database-compute tier; at a time that the initial database-compute tier fails to accommodate the one or more database-compute tolerances, increase from the initial database-compute tier to an adjusted database-compute tier based on the initial database-compute tier and tolerance layer computation; at a requisition layer of the tier requisition stack: generate a provisional tier requisition token designating a request for date-compute resources at the adjusted database-compute tier; and based on a finalization directive, generate a finalized tier requisition token; and network interface circuitry configured to send the finalized tier requisition token to a host interface for control of database-compute resources.

A2 The system of example A1, where the tier requisition circuitry is further configured to, at the tolerance layer: obtain a tier recommendation associated with the host interface; compare the tier recommendation to the initial database-compute tier; and at a time the tier recommendation and the initial database-compute tier differ, generate a difference token.

A3 The system of either example A1 or A2, where the tier requisition circuitry is configured to, at the tolerance layer: increase from the initial database-compute tier to an adjusted database-compute tier by: until the adjusted database-compute tier is found, interactively determining an iterated database-compute tier by increasing from a previous database-compute tier by one increment, the previous database-compute tier being equal to the initial database-compute tier for a first iteration.

A4 The system of any of examples A1-A3, where the tier requisition circuitry is configured to, at a predictive engine layer of the tier requisition stack: obtain forecasted utilization data including the data types; obtain a forecasted stratum from among strata for each of the data types, where each forecasted stratum of the strata is assigned a forecast activity coefficient; obtain forecasted coefficients in accord with the corresponding type weights to obtain a forecasted activity factor; and determine a forecasted database-compute tier.

A5 The system of any of examples A1-A4, where the tier requisition circuitry is configured to, at the predictive engine layer, train a deep learning algorithm using the historical data to obtain the forecasted utilization data.

A6 The system of any of examples A1-A5, where the tier requisition circuitry is configured to, at the tolerance layer, apply a core factor to scale the activity factor relative to a number of processor cores to which the historical data applies.

A7 The system of any of examples A1-A6, where the tier requisition circuitry is configured to, at a consumption savings layer of the tier requisition stack: obtain consumption metric data for the initial and adjusted database-compute tiers; determine an initial consumption level using the consumption metric data for the initial database-compute tier; determine an adjusted consumption level using the consumption metric data for the adjusted database-compute tier; and compare the initial consumption level to the adjusted consumption level to determine an accommodation consumption factor.

A8 The system of any of examples A1-A7, where the tier requisition circuitry is configured to, at the consumption savings layer, decrease from the adjusted database-compute tier when the accommodation consumption factor exceeds a threshold to obtain a consumption-adjusted database compute tier.

A9 The system of any of examples A1-A8, where the tier requisition circuitry is configured to, at a consumption savings layer of the tier requisition stack: obtain consumption metric data for a historical database-compute tier and the adjusted database-compute tier, the historical database-compute tier associated with operation during capture of at least a portion of the historical data; determine an historical consumption level using the consumption metric data for the historical database-compute tier; determine an adjusted consumption level using the consumption metric data for the adjusted database-compute tier; and compare the historical consumption level to the adjusted consumption level to determine a consumption change factor.

A10 The system of any of examples A1-A9, where the tier requisition circuitry is configured to, at the consumption savings layer, decrease from the adjusted database-compute tier when the consumption change factor exceeds a threshold to obtain a consumption-adjusted database compute tier.

A11 The system of any of examples A1-A10, where the finalization directive includes: an operator input command received at a database-compute control-interface generated at a presentation layer of the tier requisition stack; a feedback-trained machine learning adjustment determined based on an operator input command history; or both.

A12 The system of any of examples A1-A11, where the one or more database-compute tolerances include: a tolerance for non-online-transaction-processing (non-OLTP) storage; a concurrent sessions tolerance factor; a concurrent requests tolerance factor; a storage volume tolerance; a request accumulation tolerance; or any combination of the foregoing.

B1 In an example, a method includes: at a data input layer of a tier requisition stack: obtaining historical data including data types, the data types including processor utilization type data, operation rate type data, flush volume type data, or any combination thereof; and obtaining database-compute tolerance data establishing one or more database-compute tolerances; at a coefficient layer of the tier requisition stack: accessing the data types via a memory resource provided by a data-staging layer of the tier requisition stack; determining a corresponding stratum from among strata for each of the data types, where each stratum of the strata is assigned a corresponding activity coefficient; for each of the data types, obtaining a corresponding type weight; and combining the corresponding activity coefficients in accord with the corresponding type weights to obtain an activity factor; at a tolerance layer of the tier requisition stack: determining an initial database-compute tier based on the activity factor, the initial database-compute tier associated with a database-compute allowance; comparing the database-compute allowance to the database-compute tolerance data to determine accommodation of the one or more database-compute tolerances by the initial database-compute tier; at a time that the initial database-compute tier fails to accommodate the one or more database-compute tolerances, increasing from the initial database-compute tier to an adjusted database-compute tier based on the initial database-compute tier and tolerance layer computation; at a requisition layer of the tier requisition stack: generating a provisional tier requisition token designating a request for date-compute resources at the adjusted database-compute tier; and based on a finalization directive, generating a finalized tier requisition token; and sending, via network interface circuitry, the finalized tier requisition token to a host interface for control of database-compute resources.

B2 The method of example B1, further including: at the tolerance layer: obtaining a tier recommendation associated with the host interface; comparing the tier recommendation to the initial database-compute tier; and at a time the tier recommendation and the initial database-compute tier differ, generating a difference token.

B3 The method of either example B1 or B2, further including: at the tolerance layer: increasing from the initial database-compute tier by: until the adjusted database-compute tier is found, interactively determining an iterated database-compute tier by increasing from a previous database-compute tier by one increment, the previous database-compute tier being equal to the initial database-compute tier for a first iteration.

B4 The method of any of examples B1-B3, further including: at a predictive engine layer of the tier requisition stack: obtaining forecasted utilization data including the data types; obtaining a forecasted stratum from among strata for each of the data types, where each forecasted stratum of the strata is assigned a forecast activity coefficient; obtaining forecasted coefficients in accord with the corresponding type weights to obtain a forecasted activity factor; and determine a forecasted database-compute tier.

B5 The method of any of examples B1-B4, further including, at the predictive engine layer, training a deep learning algorithm using the historical data to obtain the forecasted utilization data.

C1 In an example, a product includes: machine-readable media other than a transitory signal; and instructions stored on the machine-readable media, the instructions configured to cause a machine to: at a data input layer of a tier requisition stack: obtain historical data including data types, the data types including processor utilization type data, operation rate type data, flush volume type data, or any combination thereof; and obtain database-compute tolerance data establishing one or more database-compute tolerances; at a coefficient layer of the tier requisition stack: access the data types via a memory resource provided by a data-staging layer of the tier requisition stack; determine a corresponding stratum from among strata for each of the data types, where each stratum of the strata is assigned a corresponding activity coefficient; for each of the data types, obtain a corresponding type weight; and combine the corresponding activity coefficients in accord with the corresponding type weights to obtain an activity factor; at a tolerance layer of the tier requisition stack: determine an initial database-compute tier based on the activity factor, the initial database-compute tier associated with a database-compute allowance; compare the database-compute allowance to the database-compute tolerance data to determine accommodation of the one or more database-compute tolerances by the initial database-compute tier; at a time that the initial database-compute tier fails to accommodate the one or more database-compute tolerances, increase from the initial database-compute tier to an adjusted database-compute tier based on the initial database-compute tier and tolerance layer computation; at a requisition layer of the tier requisition stack: generate a provisional tier requisition token designating a request for date-compute resources at the adjusted database-compute tier; and based on a finalization directive, generate a finalized tier requisition token; and send, via network interface circuitry, the finalized tier requisition token to a host interface for control of database-compute resources.

C2 The product of example C1, where the finalization directive includes: an operator input command received at a database-compute control-interface generated at a presentation layer of the tier requisition stack; a feedback-trained machine learning adjustment determined based on an operator input command history; or both.

C3 The product of either example C1 or C2, where the one or more database-compute tolerances include: a tolerance for non-online-transaction-processing (non-OLTP) storage; a concurrent sessions tolerance factor; a concurrent requests tolerance factor; a storage volume tolerance; a request accumulation tolerance; or any combination of the foregoing.

D1 A method implemented by operation of a system of any of examples A1-A12.

E1 A product including instructions stored on a machine readable medium, the instructions configured to cause a machine to implement the method of example D1.

Various implementations have been specifically described. However, many other implementations are also possible.

What is claimed is:
1. A system including:
tier requisition circuitry configured to execute a tier requisition stack, the tier requisition circuitry configured to:
at a data input layer of the tier requisition stack:
obtain historical data including data types, the data types including processor utilization type data, operation rate type data, flush volume type data, or any combination thereof; and
obtain database-compute tolerance data establishing one or more database-compute tolerances;
at a coefficient layer of the tier requisition stack:
access the data types via a memory resource provided by a data-staging layer of the tier requisition stack;
determine a corresponding stratum from among strata for each of the data types, where each stratum of the strata is assigned a corresponding activity coefficient;
for each of the data types, obtain a corresponding type weight; and
combine the corresponding activity coefficients in accord with the corresponding type weights to obtain an activity factor;
at a tolerance layer of the tier requisition stack:
determine an initial database-compute tier based on the activity factor, the initial database-compute tier associated with a database-compute allowance;
compare the database-compute allowance to the database-compute tolerance data to determine accommodation of the one or more database-compute tolerances by the initial database-compute tier;
at a time that the initial database-compute tier fails to accommodate the one or more database-compute tolerances, increase from the initial database-compute tier to an adjusted database-compute tier based on the initial database-compute tier and tolerance layer computation;

at a requisition layer of the tier requisition stack:
  generate a provisional tier requisition token designating a request for date-compute resources at the adjusted database-compute tier; and
    based on a finalization directive, generate a finalized tier requisition token; and
network interface circuitry configured to send the finalized tier requisition token to a host interface for control of database-compute resources.

2. The system of claim 1, where the tier requisition circuitry is further configured to, at the tolerance layer:
  obtain a tier recommendation associated with the host interface;
  compare the tier recommendation to the initial database-compute tier; and
  at a time the tier recommendation and the initial database-compute tier differ, generate a difference token.

3. The system of claim 1, where the tier requisition circuitry is configured to, at the tolerance layer:
  increase from the initial database-compute tier to the adjusted database-compute tier by:
    until the adjusted database-compute tier is found, interactively determining an iterated database-compute tier by increasing from a previous database-compute tier by one increment, the previous database-compute tier being equal to the initial database-compute tier for a first iteration.

4. The system of claim 1, where the tier requisition circuitry is configured to, at a predictive engine layer of the tier requisition stack:
  obtain forecasted utilization data including the data types;
  obtain a forecasted stratum from among strata for each of the data types, where each forecasted stratum of the strata is assigned a forecast activity coefficient;
  obtain forecasted coefficients in accord with the corresponding type weights to obtain a forecasted activity factor; and
  determine a forecasted database-compute tier.

5. The system of claim 4, where the tier requisition circuitry is configured to, at the predictive engine layer, train a deep learning algorithm using the historical data to obtain the forecasted utilization data.

6. The system of claim 1, where tier requisition circuitry is configured to, at the tolerance layer, apply a core factor to scale the activity factor relative to a number of processor cores to which the historical data applies.

7. The system of claim 1, where the tier requisition circuitry is configured to, at a consumption savings layer of the tier requisition stack:
  obtain consumption metric data for the initial and adjusted database-compute tiers;
  determine an initial consumption level using the consumption metric data for the initial database-compute tier;
  determine an adjusted consumption level using the consumption metric data for the adjusted database-compute tier; and
  compare the initial consumption level to the adjusted consumption level to determine an accommodation consumption factor.

8. The system of claim 7, where the tier requisition circuitry is configured to, at the consumption savings layer, decrease from the adjusted database-compute tier when the accommodation consumption factor exceeds a threshold to obtain a consumption-adjusted database compute tier.

9. The system of claim 1, where the tier requisition circuitry is configured to, at a consumption savings layer of the tier requisition stack:
  obtain consumption metric data for a historical database-compute tier and the adjusted database-compute tier, the historical database-compute tier associated with operation during capture of at least a portion of the historical data;
  determine an historical consumption level using the consumption metric data for the historical database-compute tier;
  determine an adjusted consumption level using the consumption metric data for the adjusted database-compute tier; and
  compare the historical consumption level to the adjusted consumption level to determine a consumption change factor.

10. The system of claim 9, where the tier requisition circuitry is configured to, at the consumption savings layer, decrease from the adjusted database-compute tier when the consumption change factor exceeds a threshold to obtain a consumption-adjusted database compute tier.

11. The system of claim 1, where the finalization directive includes:
  an operator input command received at a database-compute control-interface generated at a presentation layer of the tier requisition stack;
  a feedback-trained machine learning adjustment determined based on an operator input command history; or both.

12. The system of claim 1, where the one or more database-compute tolerances include:
  a tolerance for non-online-transaction-processing (non-OLTP) storage;
  a concurrent sessions tolerance factor;
  a concurrent requests tolerance factor;
  a storage volume tolerance;
  a request accumulation tolerance; or
  any combination of the foregoing.

13. A method including:
  at a data input layer of a tier requisition stack:
    obtaining historical data including data types, the data types including processor utilization type data, operation rate type data, flush volume type data, or any combination thereof; and
    obtaining database-compute tolerance data establishing one or more database-compute tolerances;
  at a coefficient layer of the tier requisition stack:
    accessing the data types via a memory resource provided by a data-staging layer of the tier requisition stack;
    determining a corresponding stratum from among strata for each of the data types, where each stratum of the strata is assigned a corresponding activity coefficient;
    for each of the data types, obtaining a corresponding type weight; and
    combining the corresponding activity coefficients in accord with the corresponding type weights to obtain an activity factor;
  at a tolerance layer of the tier requisition stack:
    determining an initial database-compute tier based on the activity factor, the initial database-compute tier associated with a database-compute allowance;
    comparing the database-compute allowance to the database-compute tolerance data to determine accommodation of the one or more database-compute tolerances by the initial database-compute tier;

at a time that the initial database-compute tier fails to accommodate the one or more database-compute tolerances, increasing from the initial database-compute tier to an adjusted database-compute tier based on the initial database-compute tier and tolerance layer computation;

at a requisition layer of the tier requisition stack:

generating a provisional tier requisition token designating a request for date-compute resources at the adjusted database-compute tier; and based on a finalization directive, generating a finalized tier requisition token; and sending, via network interface circuitry, the finalized tier requisition token to a host interface for control of database-compute resources.

14. The method of claim 13, further including:
at the tolerance layer:
obtaining a tier recommendation associated with the host interface;
comparing the tier recommendation to the initial database-compute tier; and
at a time the tier recommendation and the initial database-compute tier differ, generating a difference token.

15. The method of claim 13, further including:
at the tolerance layer:
increasing from the initial database-compute tier by:
until the adjusted database-compute tier is found, interactively determining an iterated database-compute tier by increasing from a previous database-compute tier by one increment, the previous database-compute tier being equal to the initial database-compute tier for a first iteration.

16. The method of claim 13, further including:
at a predictive engine layer of the tier requisition stack:
obtaining forecasted utilization data including the data types;
obtaining a forecasted stratum from among strata for each of the data types, where each forecasted stratum of the strata is assigned a forecast activity coefficient;
obtaining forecasted coefficients in accord with the corresponding type weights to obtain a forecasted activity factor; and
determine a forecasted database-compute tier.

17. The method of claim 16, further including, at the predictive engine layer, training a deep learning algorithm using the historical data to obtain the forecasted utilization data.

18. A product including:
machine-readable media other than a transitory signal; and
instructions stored on the machine-readable media, the instructions configured to cause a machine to:
at a data input layer of a tier requisition stack:
obtain historical data including data types, the data types including processor utilization type data, operation rate type data, flush volume type data, or any combination thereof; and
obtain database-compute tolerance data establishing one or more database-compute tolerances;
at a coefficient layer of the tier requisition stack:
access the data types via a memory resource provided by a data-staging layer of the tier requisition stack;
determine a corresponding stratum from among strata for each of the data types, where each stratum of the strata is assigned a corresponding activity coefficient;
for each of the data types, obtain a corresponding type weight; and
combine the corresponding activity coefficients in accord with the corresponding type weights to obtain an activity factor;
at a tolerance layer of the tier requisition stack:
determine an initial database-compute tier based on the activity factor, the initial database-compute tier associated with a database-compute allowance;
compare the database-compute allowance to the database-compute tolerance data to determine accommodation of the one or more database-compute tolerances by the initial database-compute tier;
at a time that the initial database-compute tier fails to accommodate the one or more database-compute tolerances, increase from the initial database-compute tier; and
determine an adjusted database-compute tier based on the initial database-compute tier and tolerance layer computation;
at a requisition layer of the tier requisition stack:
generate a provisional tier requisition token designating a request for date-compute resources at the adjusted database-compute tier; and
based on a finalization directive, generate a finalized tier requisition token; and
send, via network interface circuitry, the finalized tier requisition token to a host interface for control of database-compute resources.

19. The product of claim 18, where the finalization directive includes:
an operator input command received at a database-compute control-interface generated at a presentation layer of the tier requisition stack;
a feedback-trained machine learning adjustment determined based on an operator input command history; or both.

20. The product of claim 18, where the one or more database-compute tolerances include:
a tolerance for non-online-transaction-processing (non-OLTP) storage;
a concurrent sessions tolerance factor;
a concurrent requests tolerance factor;
a storage volume tolerance;
a request accumulation tolerance; or
any combination of the foregoing.

* * * * *